United States Patent [19]

Grenci et al.

[11] Patent Number: 5,425,264

[45] Date of Patent: Jun. 20, 1995

[54] PLASTIC HIGH VACUUM PIPING COMPONENTS

[76] Inventors: Charles A. Grenci, 205 Brown Rd., Montrose, Colo. 81401; R. Dallas Clayton, 200 Altez SE., Albuquerque, N. Mex. 87123

[21] Appl. No.: 322,389

[22] Filed: Oct. 12, 1994

Related U.S. Application Data

[63] Continuation of Ser. No. 31,571, Mar. 15, 1993, abandoned, which is a continuation-in-part of Ser. No. 894,431, Jun. 6, 1992, abandoned.

[51] Int. Cl.⁶ .............................................. G01M 3/02
[52] U.S. Cl. .......................................... 73/37; 73/23.2
[58] Field of Search ................................ 73/23.2, 37

[56] References Cited

FOREIGN PATENT DOCUMENTS 657997 4/1979 U.S.S.R. .

OTHER PUBLICATIONS

"Outgassing Properties of Some Materials", Gupta et al, Published Jun. 10, 1972.

*Primary Examiner*—Hezron E. Williams
*Assistant Examiner*—Daniel S. Larkin
*Attorney, Agent, or Firm*—Milton S. Gerstein; Marvin N. Benn

[57] ABSTRACT

A method for making vacuum components from plastic material, and in particular, PVC and CPVC, where the plastic component is exposed to a high vacuum or ultra high vacuum for an extended period of time, by which the outgas rate drops considerably to levels that are well within required limits for high vacuum and ultra high vacuum applications. Residual gas analysis may be used to certify this low outgas level for the plastic components.

8 Claims, 5 Drawing Sheets

PLASTIC HIGH VACUUM PIPING COMPONENTS

CROSS REFERENCE TO RELATED APPLICATION

This is a continuation of application Ser. No. 08/031,571, filed on Mar. 15, 1993, abandoned, which is a continuation in part of application Ser. No. 07/894,431, filed on Jun. 6, 1992, abandoned.

BACKGROUND OF THE INVENTION

1. Field of the Invention (Technical Field),

The invention relates specifically to the discovery that certain low cost thermoplastics such as Polyvinylchloride (PVC) and chlorinated polyvinylchloride (CPVC) can be excellent materials for the construction of high and ultra high vacuum components. Prior art vacuum use of these materials has been restricted to vacuum pump exhaust lines and rough vacuum. It has been conclusively determined through the use of residual gas analysis that the prior bias against the use of these materials in this service relates to surface impurities that are either a residue of manufacture, a non vacuum compatible lubricant or a joining adhesive, not continuous outgas or permeation of the PVC or CPVC plastic material itself. Subsequently, when these materials are exposed to high vacuum pressures, the surface impurities are gradually eliminated. This type of surface contamination would, by its presence, render any material unsuitable for high and ultra high vacuum service. The invention uses an outgas reduction process to demonstrate the capability of PVC and CPVC plastic compounds to be suitable for use in the construction of high and ultra high vacuum systems, where vacuum pressures from $9 \times 10^{-4}$ torr to $1 \times 10^{-11}$ torr are required. The present invention has also determined the relative purity level of the vacuum processed plastic components through the use of residual gas analysis. It should be noted that not all thermoplastic materials exhibit adequate high and ultra high vacuum performance. It is expected that through the inventions evaluation of thermoplastics that other cost effective materials may be found in addition to PVC and CPVC.

2. Background Art

The vacuum industry has considered low cost thermoplastics such as PVC, or CPVC to be unsuitable as a material of construction for high and ultra high vacuum components. This relates primarily to the perceived outgassing rate of such plastic materials and, secondly, to the perceived rate at which gases are able to permeate through the plastic material into the contained vacuum pressure space. "Outgassing" is the tendency of materials to release gases over time. The rate at which materials give off gas, or outgas, is particularly a problem in high and ultra high vacuum applications where systems are almost exclusively fabricated from expensive polished stainless steel components which have low outgassing characteristics. Metal components for high and ultra high vacuum piping are often supplied with a helium leak rate certificate but little or no information is currently supplied with vacuum piping components which specifies the outgas/permeation rate that these components produce. Low cost PVC and CPVC components are typically used in the construction of liquid transfer piping systems. Because these components are manufactured in very high quantity they are low in cost to end users.

SUMMARY OF THE INVENTION

Certain low cost thermoplastic materials such as PVC and CPVC are excellent low cost high and ultra high vacuum materials. We have discovered that when a clean PVC or CPVC component is exposed to high and ultra high vacuum pressures for a period of time, the outgas rate for the PVC or CPVC component drops dramatically to levels which are well within required limits for high and ultra high vacuum applications where vacuum pressures from $9 \times 10^{-4}$ torr to $1 \times 10^{-11}$ torr are required. Subsequently, it is a purpose of this invention to show that low cost materials such as PVC and. CPVC are suitable, and in certain cases superior to stainless steel, for high and ultra high vacuum component service. This is demonstrated through outgas reduction of surface impurities by exposing said materials to high and ultra high vacuum and through residual gas analysis determination of the outgas levels for said materials while exposed to high and ultra high vacuum pressures.

It is also the intent of this invention to provide the user of these processed plastic components with documentation that shows the type and relative amount of contamination that the components would contribute to their vacuum process at a given vacuum pressure prior to the fabrication/installation of their system.

BRIEF DESCRIPTION OF THE DRAWINGS

The accompanying drawings, which are incorporated into and form a part of the specification, illustrate the preferred embodiment of the invention and, subsequently, are not to be construed as limiting the invention.

DESCRIPTION OF THE PREFERRED EMBODIMENTS

This invention is directed to a new use of thermoplastic material for the construction of components for high and ultra high vacuum environment generation and containment. According to the invention, it has been proven that certain low cost thermoplastics such as PVC, and CPVC, can replace expensive metal components in high and ultra high vacuum systems through the use of residual gas analysis evaluation. When these thermoplastic materials are exposed to high vacuum pressures, the surface impurities that initially are damaging to high and ultra high vacuum pressures are gradually eliminated. The present invention has used an outgas reduction process to demonstrate the capability of PVC and CPVC plastic compounds to be suitable for use in the construction of high and ultra high vacuum systems, where vacuum pressures from $9 \times 10^{-4}$ torr to $1 \times 10^{-11}$ torr are required. Additional thermoplastic materials can be used according to the invention provided they meet the criteria of low permeability to prevent gas molecules from migrating through the material into the contained high or ultra high vacuum and low outgassing characteristics which is the tendency of a material to give off gas molecules into a vacuum. It should be noted that not all thermoplastic materials exhibit adequate high and ultra high vacuum performance. The method of the invention determines the relative purity level of the vacuum processed plastic components through the use of residual gas analysis. It is expected that through the inventions evaluation of thermoplastics that other cost effective materials may be found in addition to PVC and CPVC.

Figure 1:
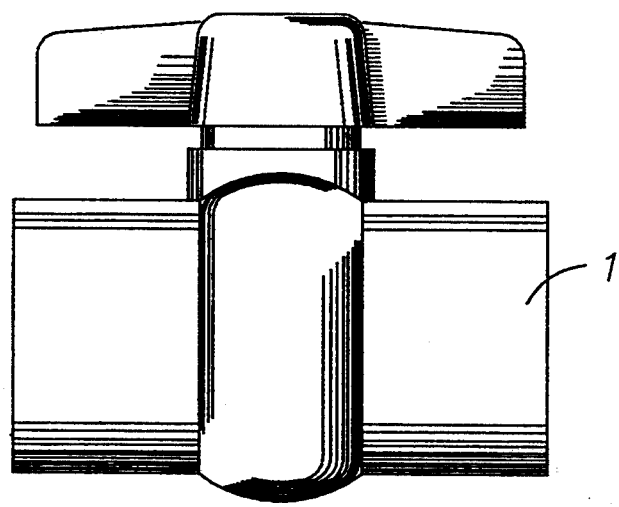
FIG. 1 is an elevation view of a low cost PVC ball valve that has been modified for high and ultra high vacuum service by replacing the standard valve lubricant with a vacuum compatible lubricant.

Referring to FIG. 1, the PVC/CPVC ball valve 1 is shown to illustrate the discovery that expensive stainless steel high and ultra high vacuum valves can be replaced, in many high and ultra high vacuum applications, by a low cost PVC ball valve that has been modified for high and ultra high vacuum service by replacing the standard valve lubricant with a vacuum compatible lubricant such as "KRYTOX" grease from Dupont.

Figure 2:
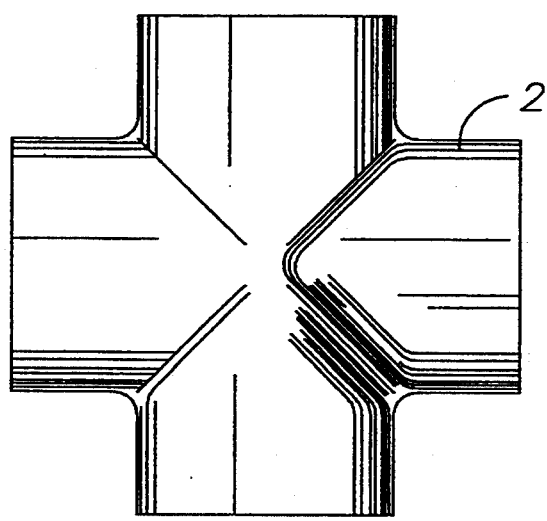
FIG. 2 is an elevation view of a low cost CPVC cross that illustrates the wide range of existing low cost PVC and CPVC rigid piping component shapes that can replace expensive metal component shapes in the fabrication of high and ultra high vacuum piping systems.

Referring to FIG. 2 a 8" diameter PVC cross 2 is shown to illustrate the discovery that expensive large diameter stainless steel piping components can be replaced, in many high and ultra high vacuum applications, by a low cost PVC component that is actually superior to stainless steel in certain applications. Many other sizes and shapes of piping components can be used.

Figure 3:
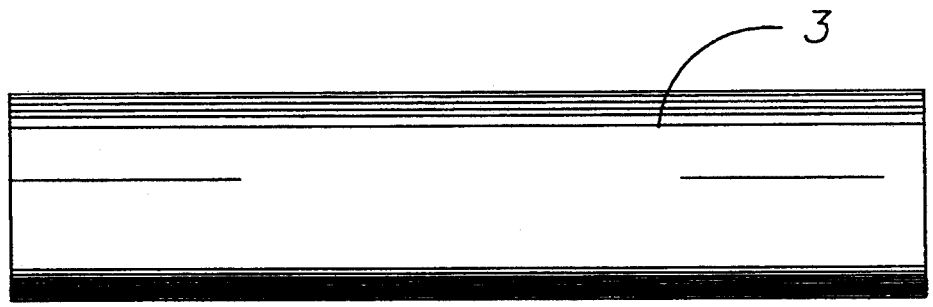
FIG. 3 is an elevation view of a section of low cost flexible PVC tubing that can replace expensive flexible metal bellows tubing in high and ultra high vacuum piping systems where a flexible connection is required.

Referring to FIG. 3, a 12" section of 4" diameter flexible PVC tubing 3, is shown to illustrate our discovery that an expensive section of metal bellows tubing can be replaced by a low cost flexible PVC section in certain high and ultra high vacuum piping applications where a flexible connection is required.

Figure 4:
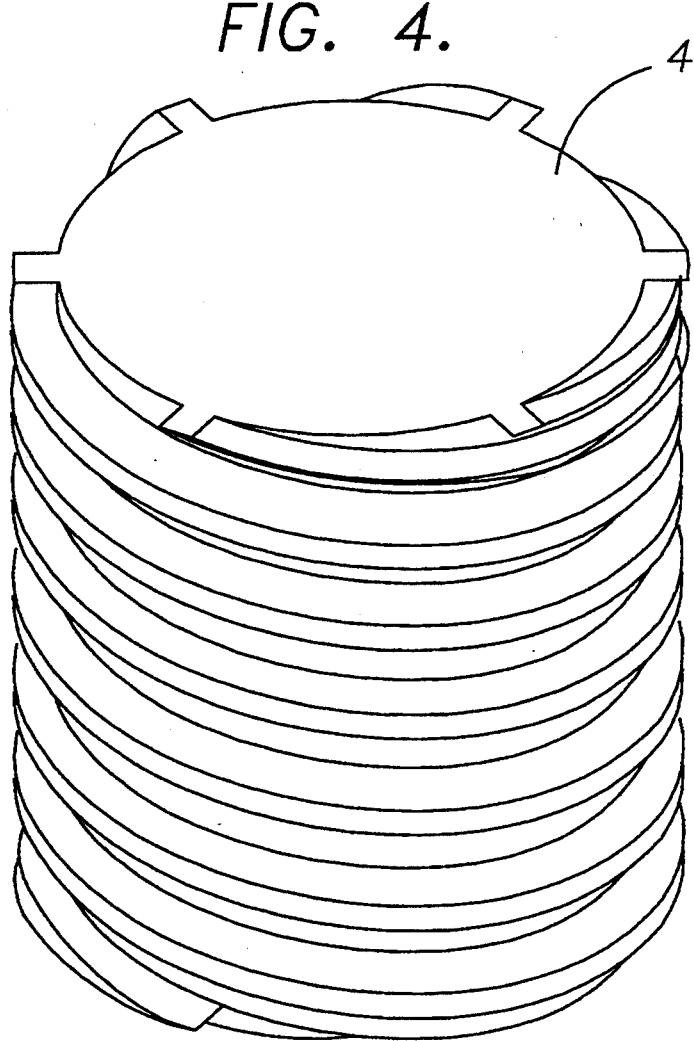
FIG. 4 is a perspective view of a molded CPVC molecular drag pump rotor to show a complex shape, high and ultra high vacuum pump component that can be molded from plastic much more economically than it can be machined from aluminum or stainless steel.

Referring to FIG. 4 an injection molded CPVC molecular drag pump rotor 4, is shown to illustrate a complex shape, high and ultra high vacuum pump component that can be molded from plastic much more economically than it can be machined from aluminum or stainless steel.

Figure 5:
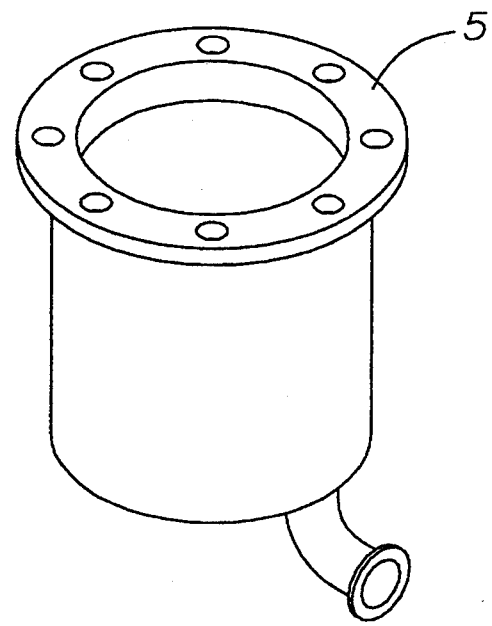
FIG. 5 is a perspective view of a molded PVC molecular drag pump stator/housing to illustrate further the ability to produce the two major components of a high vacuum molecular drag pump from molded plastic instead of machined metal.

Referring to FIG. 5 a molded PVG molecular drag pump stator/housing 5, is shown to illustrate further the ability to produce the two major components of a high vacuum molecular drag pump from molded plastic instead of machined metal at a dramatic reduction in cost.

Figure 6:
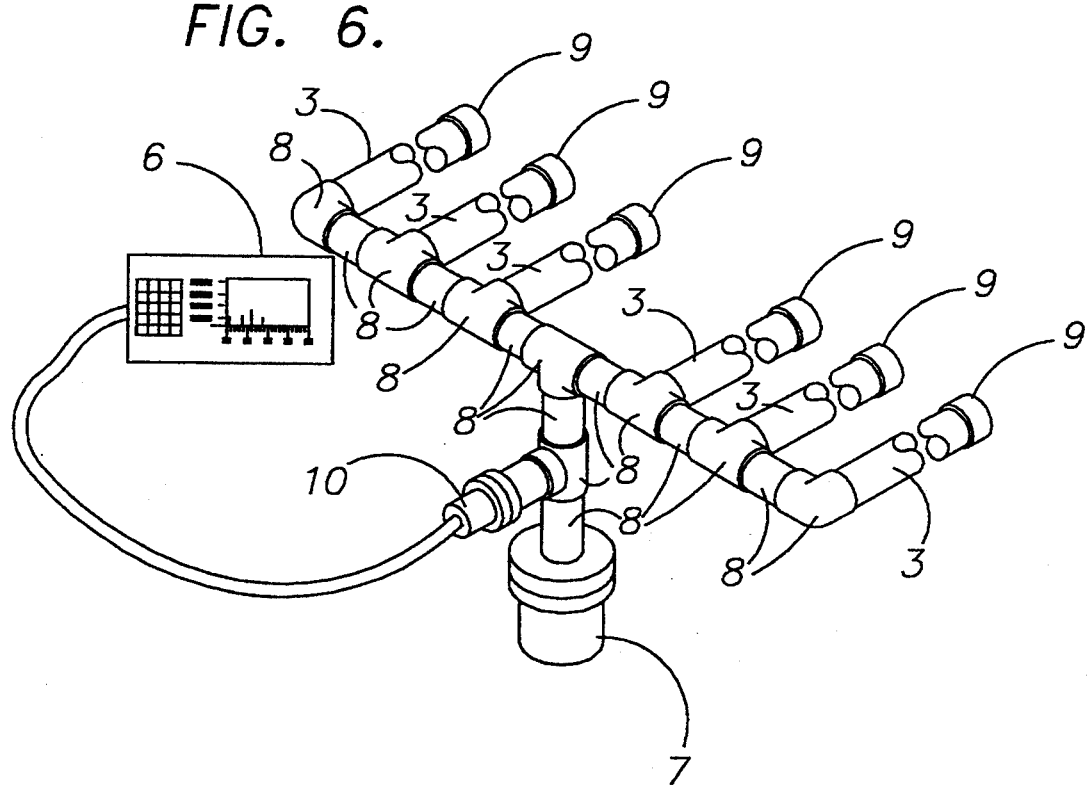
FIG. 6 is a perspective view of a typical system configuration for high and ultra high vacuum outgas evaluation/reduction of plastic piping component material or material interior surface contamination.

Referring to FIG. 6, a typical system for high and ultra high vacuum outgas reduction/evaluation of thermoplastic piping component material or material interior surface contamination is shown. In this example, flexible PVC tubing 3 is capped 9 and connected to a high and ultra high vacuum outgas reduction manifold 8 and then subsequently evacuated by a high and ultra high vacuum pump 7 until a specific high and ultra high vacuum pressure, and or an outgas rate for each atomic mass unit between 0 and 100 is attained on a residual gas analysis device 6 which is connected to a residual gas sensor 10. The said analysis device and sensor used in the invention was the model "PPT" from MKS instruments connection to an ALR "flyer" model PC. The results of this process are stored for customer distribution.

Figure 7:
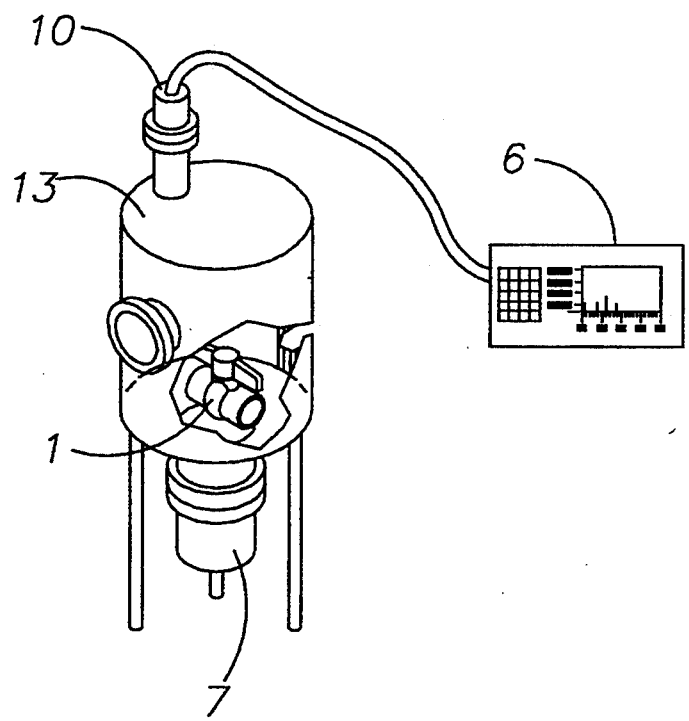
FIG. 7 is a perspective view of a typical system configuration for high and ultra high vacuum outgas reduction/evaluation of plastic piping component material or material surface contamination inside a vacuum chamber.

Referring to FIG. 7, there is shown a typical system for high and ultra high vacuum outgas reduction/evaluation of entire thermoplastic piping components interior and exterior surfaces. In this example, the PVC/CPVC ball valve 1 is placed into a high and ultra high vacuum outgas reduction chamber 13 and evacuated by a high and ultra high vacuum pump 7 until a specific high and ultra high vacuum pressure and/or a specific outgas rate for each atomic mass unit between 0 and 100 is attained on a residual gas analysis device 6 which is connected to a residual gas sensor 10.

Figure 8:
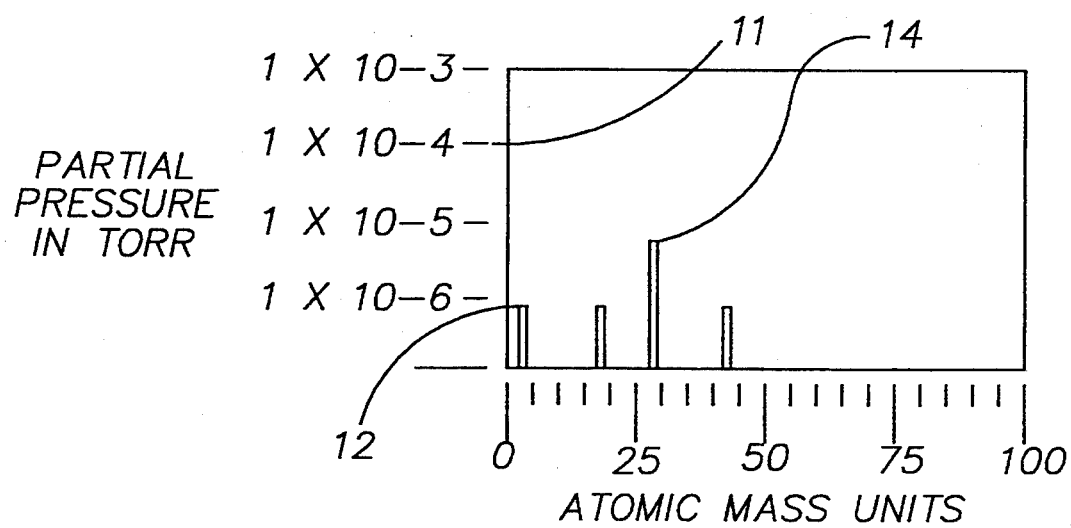
FIG. 8 is an elevation view of a residual gas analysis xy bar chart display with the partial pressure levels of specific atomic mass units.

Referring to FIG. 8, a residual gas analysis bar chart is shown with bar levels which represent the partial pressure reading scale levels 11 of individual atomic mass units such as the Atomic Mass Unit Four—Helium 12 and Atomic Mass Unit Twenty-Eight—Nitrogen 14. The partial pressure for each atomic mass unit added together is equal to the total vacuum pressure. Through careful monitoring of individual atomic mass unit partial pressures, it is possible to determine both the purity of the components which are undergoing high and ultra high vacuum outgas reduction and the integrity/effectiveness of the high and ultra high vacuum outgas reduction/evaluation system.

Figure 9:
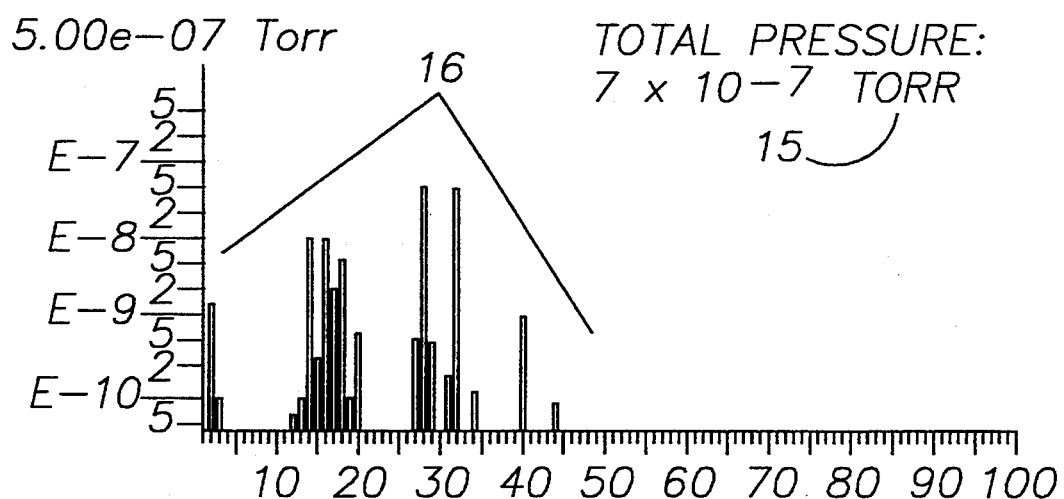
FIG. 9 is an elevation view of an actual residual gas analysis spectra display during initial high and ultra high vacuum outgas reduction/evaluation of 2 8" diameter PVC tees.

Referring to FIG. 9, an actual residual gas analysis initial outgas reduction spectra 16 is shown. This actual data was taken 6 hours after 2 8" diameter PVC tees were connected to a high and ultra high vacuum outgas reduction manifold. The spectra shows numerous atomic mass units present in the composition of thermoplastic material or surface impurities outgassing into the manifold system.

Figure 10:
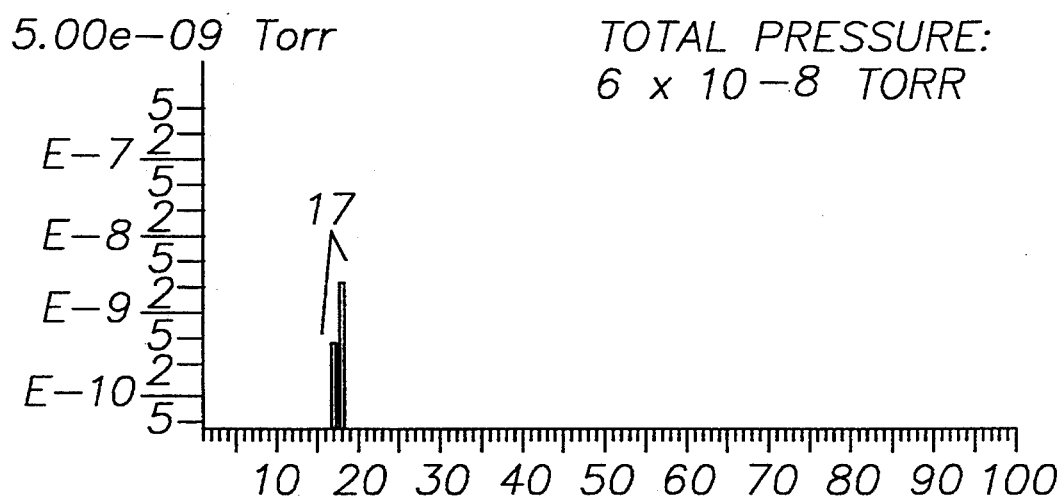
FIG. 10 is an elevation view of an actual residual gas analysis display spectra during final high and ultra high vacuum outgas reduction/evaluation of 2 ea. 8" diameter PVC tees.

Referring to FIG. 10, an outgas reduction spectra 17 is shown 72 hours after connecting the 8" PVC tees to the high and ultra high vacuum outgas reduction manifold. The only significant atomic mass unit outgas contributors are Seventeen and Eighteen which are the secondary and primary atomic mass units for water. These partial pressure levels for water vapor are very low for an unheated vacuum chamber showing that it may be easier to remove water vapor molecules from a thermoplastic system than it is in a stainless steel or aluminum chamber.

What we claim is:

1. A method of using thermoplastic material, comprising:

producing a vacuum-component made of thermoplastic material for vacuum systems having operating vacuum pressures below approximately $9 \times 10^{-4}$ torr;

said step of producing comprising choosing a thermoplastic material that has low gas permeability and a low out-gassing rate in its steady-state operation;

said step of producing further comprising shaping said thermoplastic material into a desired component-shape, and thereafter, reducing the outgassing of said component-shape before the steady-state use of said component-shape in a vacuum system; said step of reducing comprising evacuating at least the interior surfaces of said component-shape to a vacuum pressure approximately equal to the vacuum pressure of the system in which said component-shape is used.

2. The method according to claim 1, wherein said step of producing a vacuum-component comprises making said vacuum-component into one of a tubing, valve, pump, cross-shaped member, or rotor.

3. A system for evaluating thermoplastic material for use in vacuum systems comprising:

a vacuum source for creating a vacuum;

coupling means coupling said vacuum source to said thermoplastic material for exposing at least a portion of said thermoplastic material to said vacuum;

a residual gas measuring system operatively coupled to said coupling means for detecting and measuring the outgassing of residual gas from said at least a portion of said thermoplastic material, whereby it may be determined if the thermoplastic material is suitable for use as a vacuum-component for vacuum pressures below vacuum pressures of approximately $9 \times 10^{-4}$ torr.

4. A system for evaluating thermoplastic material for use in vacuum systems according to claim 3, wherein said coupling means coupling said vacuum source to said thermoplastic material comprises a vacuum chamber in which said thermoplastic material is placed.

5. A system for evaluating thermoplastic material for use in vacuum systems according to claim 3, wherein said thermoplastic material comprises a component-shape having an interior surface and an exterior surface; said coupling means coupling said vacuum source to said thermoplastic material comprising at least one hollow-connector having an end secured to an end of said component-shape, whereby said interior surface of said component-shape is exposed to said vacuum source, and said exterior surface is exposed to ambient.

6. A method of using a vacuum component made of thermoplastic material, comprising:

(a) operatively coupling a vacuum component made of thermoplastic material into a vacuum system having steady-state operating vacuum pressures below approximately $9 \times 10^{-4}$ torr;

(b) reducing the outgassing of said vacuum component before the steady-state operating vacuum pressure of said vacuum system has been reached;

(c) said step of reducing comprising initially evacuating said vacuum system in order to attain said steady-state operating vacuum pressure; said step of initially evacuating causing the vacuum component made of thermoplastic material to have a low outgassing rate at said steady-state operating vacuum pressure of the vacuum system in which the component was coupled in said step (a).

7. In a vacuum system having a steady-state operating vacuum pressure below approximately $9 \times 10^{-4}$ torr, said vacuum system comprising a plurality of individual, separate and independent vacuum components that are capable of being interconnected together and operating at said steady-state operating vacuum-pressure after said vacuum system has been initially evacuated to attain said steady-state operating vacuum-pressure, the improvement comprising:

at least one of said vacuum components being made entirely of thermoplastic material.

8. The vacuum system according to claim 7, wherein said at least one component comprises one of a: tubing, valve, pump, cross-shaped member, and rotor.

* * * * *